United States Patent [19]

Goodbary

[11] 4,106,813
[45] Aug. 15, 1978

[54] BOTTOM DUMP DOOR LINKAGE APPARATUS AND DUMP BODY PARTITION MEANS

[75] Inventor: Edgar R. Goodbary, Cardin, Okla.

[73] Assignee: Goodbary Engineering Co., Cardin, Okla.

[21] Appl. No.: 744,432

[22] Filed: Nov. 23, 1976

[51] Int. Cl.² .............................................. B60P 1/56
[52] U.S. Cl. ................................. 298/35 M; 105/240
[58] Field of Search ....................... 298/31, 32, 33, 34, 298/35 R, 8 H, 35 M, 8 R, 36, 37; 105/240, 247, 253; 222/176, 178

[56] References Cited

U.S. PATENT DOCUMENTS

| | | | |
|---|---|---|---|
| 3,361,478 | 1/1968 | Ross, Jr. et al. .................. | 298/35 M |
| 3,394,663 | 7/1968 | Bryan, Jr. ........................ | 105/248 X |
| 3,863,986 | 2/1975 | Mentessi ......................... | 298/35 M |
| 3,945,511 | 3/1976 | Delorme .......................... | 214/17 C |

FOREIGN PATENT DOCUMENTS

| | | | |
|---|---|---|---|
| 1,080,022 | 4/1960 | Fed. Rep. of Germany ........ | 214/17 C |
| 1,201,387 | 9/1965 | Fed. Rep. of Germany ........ | 105/240 |
| 143,421 | 2/1969 | U.S.S.R. .......................... | 105/240 |

*Primary Examiner*—Frank E. Werner
*Attorney, Agent, or Firm*—Head, Johnson & Chafin

[57] ABSTRACT

Door opening and closing apparatus for actuation of the doors of a bottom dump type vehicle, said apparatus comprising a common linkage mechanism operable by a single power means for simultaneous and synchronized opening of the doors whereby emptying of the contents of the dump body is facilitated. In addition, a transversely extending centrally disposed partition is provided in the dump body for distributing the load of material accumulating in the dump body in a manner for substantially equalizing the load stress on the vehicle.

4 Claims, 6 Drawing Figures

BOTTOM DUMP DOOR LINKAGE APPARATUS AND DUMP BODY PARTITION MEANS

BACKGROUND OF THE INVENTION

1. Field of the Invention

This invention relates to improvements in dump type vehicles and more particularly, but not by way of limitation, to an improved apparatus for opening and closing the doors of a bottom dump vehicle and for distribution of the load carried by the dump body for equalization of the loading of the vehicle.

2. Description of the Prior Art

Extremely large, off-highway dump vehicles are becoming increasingly important in the mining industry and large construction industry, and the like, for transporting great quantities of materials in a single load. Many of these vehicles are of the rear dump type wherein the dump body is tilted in order to discharge the contents thereof. Considering the weight of these large quantities of cargo, it is frequently difficult to provide a practical rear dump type vehicle without unduly increasing the overall cost of the vehicle and utilize substantially great quantities of material in the construction thereof. Consequently, it has become increasingly desirable to utilize a bottom dump type vehicle wherein the doors are provided on the bottom of the dump body and may be opened and closed for discharging the contents of the dump body. Here again, problems arise because of the extreme size of these vehicles and the volume of material and weight of material handled thereby. It is difficult to open and close the bottom dump doors in a synchronized manner to provide any efficiency in the dumping operation. In addition, it is difficult to maintain any kind of stability for the operation of the vehicle itself if the contents of the dump body are not substantially equally distributed therein, and control of the loading of the material into the bottom dump type vehicle is difficult.

SUMMARY OF THE INVENTION

The present invention contemplates a novel means for opening and closing the doors of a bottom dump vehicle simultaneously and in synchronization. In addition, novel partition means is provided in the dump body for automatically distributing the load therein as the material is being admitted to the dump body. A pair of substantially identical, longitudinally extending doors are hingedly secured to the bottom of the dump body for opening in opposite pivotal directions from the longitudinal center of the bottom dump opening. In this matter, a maximum dumping area is provided for the dump body in order that the contents of the dump body may be quickly discharged therefrom. A linkage mechanism including substantially identical but oppositely acting link members is connected between each of the doors, and a single actuator or power means activates the linkage mechanism whereby both the doors are pivoted in the opposite directions in a simultaneous and synchronized action. In one direction of pivotal movement for the doors, the bottom dump opening is for discharge of the vehicle contents through the doors. In an opposite direction of pivotal movement for the doors, the bottom dump opening is closed and sealed for precluding discharge of the contents from the dump body.

A transversely extending partition is secured in the substantial center of the dump body and comprises an upstanding housing having an inverted V-shaped upper end exposed to the open upper side of the dump body, whereby the materials being loaded into the dump body initially strike the edge of the Vee and are diverted downwardly therefrom at an angle along each side of the partition. In this manner, substantially one-half the material is directed into the forward half of the dump body, and the other half of the material is directed into the rear half of the dump body, thus distributing the weight of the material substantially evenly in the dump body.

DESCRIPTION OF THE PREFERRED EMBODIMENTS

Figure 1:
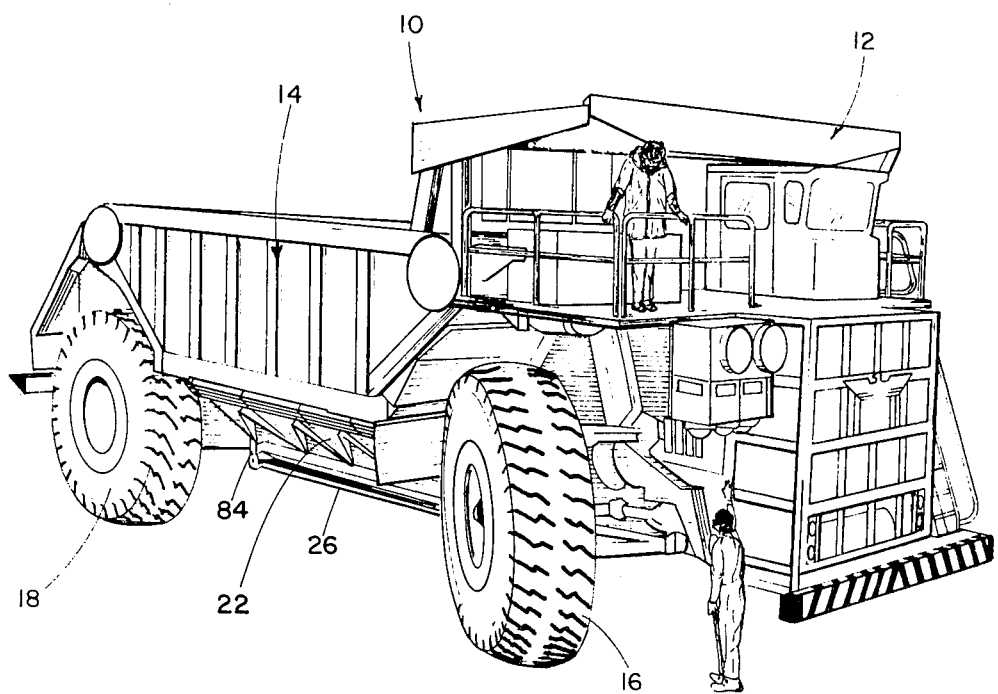
FIG. 1 is a front perspective view of the right-hand side of an off-highway dump vehicle embodying the invention.
Figure 2:
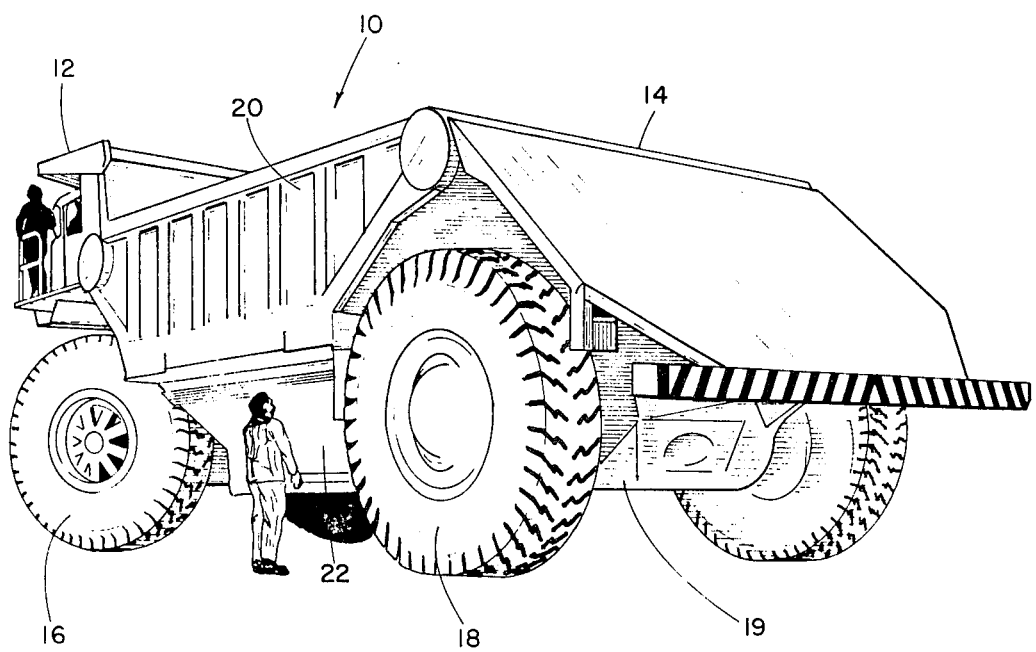
FIG. 2 is a rear perspective view of the left-hand side of an off-highway dump vehicle embodying the invention.

Referring to the drawings in detail, reference character 10 generally indicates an off-highway vehicle comprising a cab section 12 and a bottom dump type dump body 14. A pair of front wheels 16 are independently secured to the cab section in any well-known or suitable manner, and a pair of rear wheels 18 are suitably secured to the opposite ends of a rear axle 19 in any well-known manner.

The dump body 14 may be of any suitable bottom dump construction and as shown herein comprises an upper substantially box-shaped portion 20 having the upper end thereof open for receiving material (not shown) such as coal, ore, or the like, therethrough and a transversely inwardly tapered lower portion 22 terminating in a longitudinally extending centrally disposed opening 24 through which the contents of the dump body 14 may be discharged as will be hereinafter set forth. The opening 24 is closed by a pair of substantially identical doors 26 and 28, each of which is of a length substantially corresponding to the length of the opening 24 and of a width substantially equal to one-half the width of the opening 24. Thus, each door 26 and 28 covers substantially one-half the opening 24.

Figure 3:
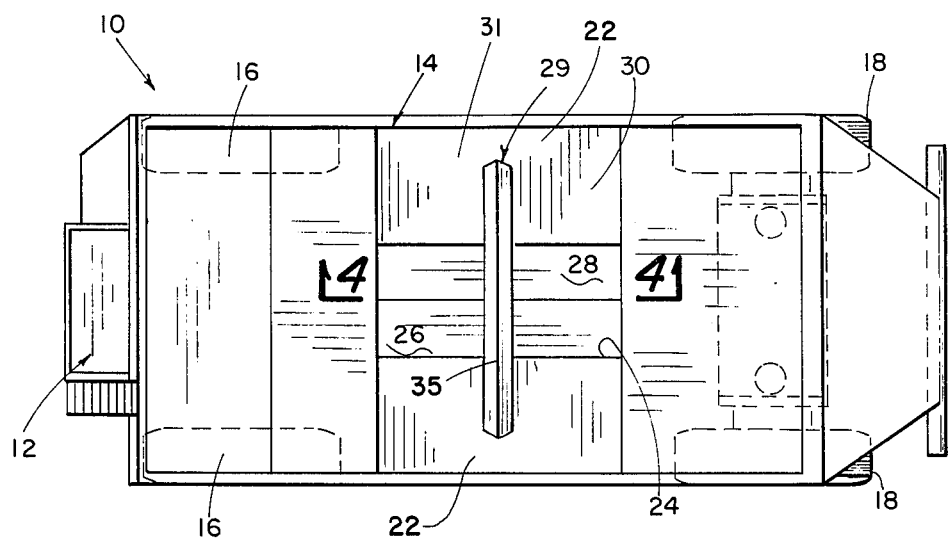
FIG. 3 is a schematic plan view of a dump vehicle embodying the invention.

An upstanding partition 29 is secured to the wall of the dump body 14 in any suitable manner, such as by welding, and extends transversely thereacross at the substantial center thereof as particularly shown in FIG. 3 to divide the interior of the dump body 14 into two substantially equal compartments 30 and 31. Whereas the partition 26 may be of any suitable construction, as particularly shown in FIG. 4, the partition 29 preferably comprises a pair of spaced upstanding sidewalls 32 and 34 having the opposite ends thereof welded or otherwise secured to the inner periphery of the dump body 14 and the lower edges thereof terminating in the proximity of the doors 26 and 28. An inwardly and upwardly extending plate 36 is welded or otherwise secured to the upper end of the sidewall 32 and abuts the outer end of a similar upwardly and inwardly extending plate member 38 secured to the upper end of the sidewall 34. This provides a substantially inverted V-shaped configuration for the upper edge 35 of the partition 29. The upper edge 35 of the partition 29 is preferably spaced below the open upper side of the box-shaped portion 20 and entirely across the tapered portion 22 as particularly shown in FIG. 3, but not limited thereto. Thus when coal, ore, or other material is "dumped" into the interior of the dump body 14 through the open upper end thereof, substantially half the material will be diverted into the chamber 30 and the other half of the material will be diverted into the chamber 31, thus substantially equalizing the load deposited in the dump body 14.

Figure 5:
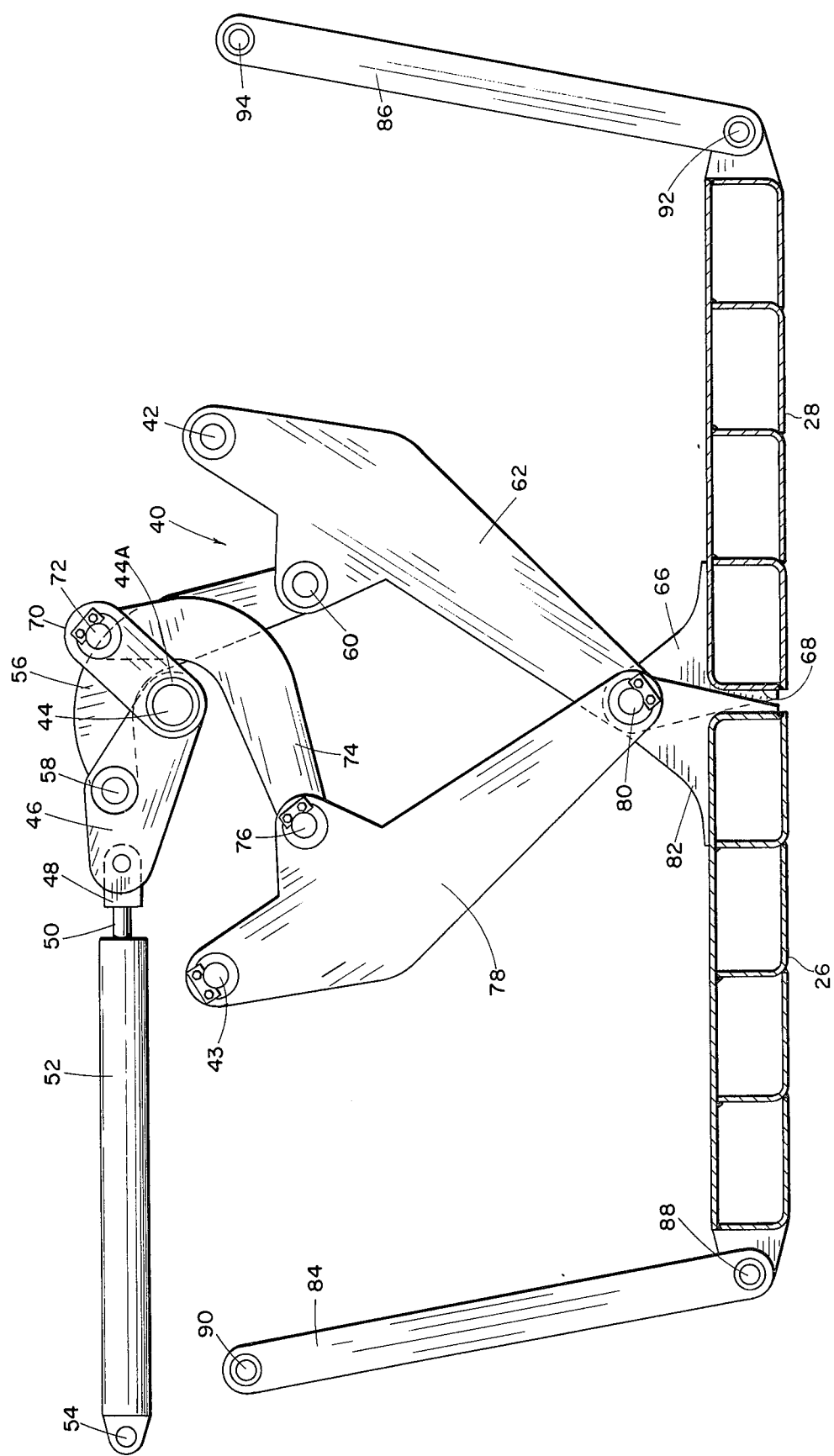
FIG. 5 is a side elevational view of a door linkage mechanism embodying the invention and illustrating the closed dump doors in transverse cross section.
Figure 6:
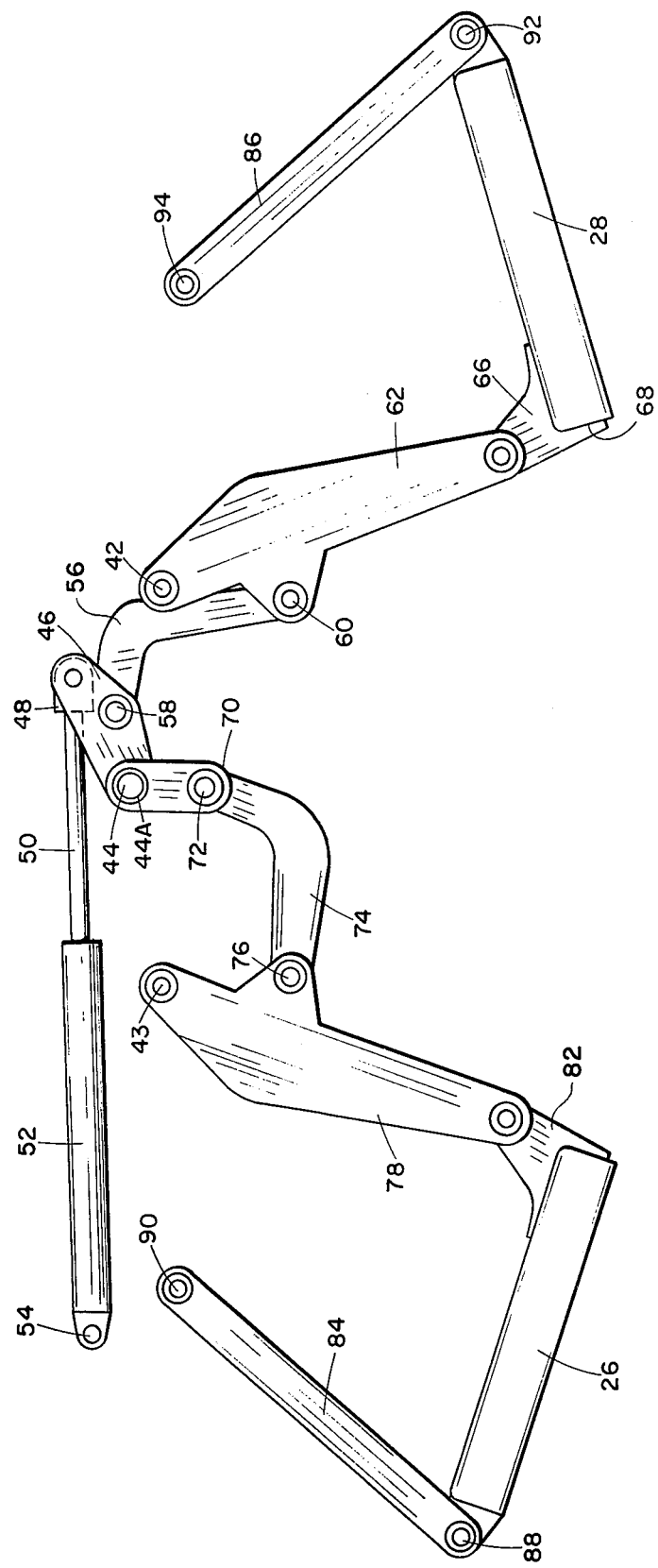
FIG. 6 is a side elevational view of a door linkage mechanism embodying the invention and illustrating the dump doors in an open position.

A door operator linkage assembly or mechanism generally indicated at 40 is interposed between the sidewalls 32 and 34 and is carried by a plurality of suitable spaced support rods 42, 43, and 44 which are welded or otherwise secured between the walls 32 and 34 in a manner whereby the linkage assembly 40 is disposed in substantial alignment with the juncture between the doors 26 and 28. The linkage assembly 40 is particularly illustrated in detail in FIGS. 5 and 6 and comprises a first pair of spaced bell crank members 46 (only one of which is shown in FIGS. 5 and 6), each having one end thereof rigidly secured to the outer periphery of the sleeve 44A suitably journalled on the rod 44. The opposite end of each bell crank 46 is pivotally secured to a tongue member 48 provided on the outer end of a piston rod 50 of a suitable hydraulic or pneumatic cylinder 52. The cylinder 52 is pivotally secured to a support rod 54 which is welded or otherwise secured between the walls 32 and 34. A bell crank 56 has one end pivotally secured between the bell cranks 46 as shown at 58 and the opposite end thereof pivotally secured at 60 to a suitable door lever member 62. The upper end of the lever 62 as viewed in the drawings is pivotally secured to the rod 42 in any well-known manner (not shown), and the opposite end thereof is pivotally secured at 64 to an upstanding flange 66 which is rigidly secured to the inner surface of the door 28 and substantially centrally disposed on the inner edge 68 thereof.

Figure 4:
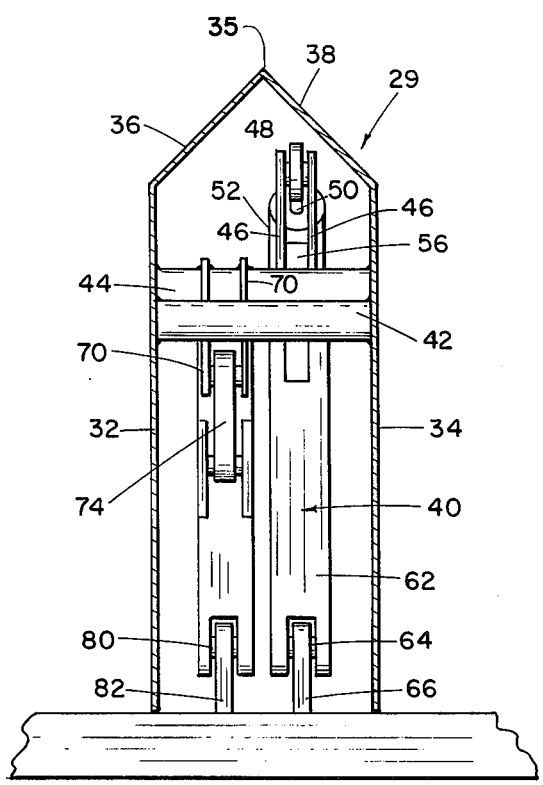
FIG. 4 is a schematic sectional view taken on line 4—4 of FIG. 3.

A pair of spaced link members 70 have one end thereof welded or otherwise rigidly secured to the outer periphery of the sleeve 44A in spaced relation to the bell cranks 46, as will be seen in FIG. 4. The opposite end of each link member 70 is pivotally secured at 72 to one end of a bell crank 74 which has its opposite end pivotally secured at 76 to a door level 78. The door lever 78 is substantially identical to the lever 62, but oppositely disposed with respect thereto for a purpose as will be hereinafter set forth. One end of the lever 78 is pivotally secured to the rod 43, and the opposite end of the lever 78 is pivotally secured at 80 to an upstanding flange 82 which is rigidly secured to the inner surface of the door 26 in substantial alignment with but spaced slightly from the flange 66 as particularly shown in FIG. 4.

The opposite ends of each door 26 and 28 are supported by suitable support rod members 84 and 86, respectively. One end of each of the rods 84 is pivotally secured to the respective end of the door 26, and the opposite end of the rods 84 are pivotally secured to a support rod 90, or the like, which in turn is rigidly secured to the vehicle 10 in any well-known manner (not shown). Similarly, each rod 86 has one end pivotally secured to the door 28 at the respective ends thereof as shown at 92, and the opposite end of the rods 86 is pivotally secured to a rod 94 similar to the rod 99.

The cylinder 52 is operably connected with a suitable fluid supply whereby the piston rod 50 may be selectively contracted and extended with respect to the cylinder 52, as is well known. When the dump body 14 is being loaded with coal, ore, or other material, the piston rod 50 is in the contracted position as shown in FIG. 5, thus actuating the linkage assembly 40 in a manner for maintaining the doors 26 and 28 in a substantially coplanar relationship for closing the opening 24. Of course, it will be apparent that suitable sealing means (not shown) may be disposed around the outer periphery of the doors 26 and 28, or any portion thereof, if desired, for reducing or substantially eliminating accidental loss of material from the body 14.

When the dump body 14 is to be unloaded, the vehicle 10 is normally driven to a suitable unloading site (not shown) and the piston rod 50 may be moved to the extended position thereof as shown in FIG. 6. This actuates the linkage assembly for moving the doors 26 and 28 in directions away from each other to the position shown in FIG. 6 for opening the opening 24. Thus, the contents of the dump body 14 may be quickly and efficiently released from the vehicle 10.

As hereinbefore set forth, the pivot rods 42, 43, 44, 90 and 94 as well as the pivot connection 54 of the cylinder 52 are all fixed position elements. Thus, when the piston rod 50 is extended from the position shown in FIG. 5 to the position shown in FIG. 6, the bell cranks 46 will be pivoted in a clockwise direction as viewed in the drawings for rotating the sleeve 44A about the support rod 44. This movement carries the bell crank 56 in a right-hand direction for pivoting the lever 62 in a counter-clockwise direction about the rod 42. This pushes the flange 66 in a right-hand direction for moving the door 28 through an arcuate lateral pathway, and the rods 86 pivot about the pivot points 94 for supporting the opposite ends of the door 28 through the swinging action thereof toward the open position shown in FIG. 6.

Simultaneously with the right-hand movement of the bell crank 56, the rotation of the sleeve 44A moves the link members 70 in a clockwise direction about the rod 44, whereby the bell crank 74 is moved in a left-hand direction. This pivots the lever 78 in a clockwise direction about the pivot rod 43 and pushes the flange in a left-hand direction for moving the door 26 through an arcuate lateral pathway, and the rods 84 pivot about the pivot point 90 for supporting the opposite ends of the door 26 through the swinging action thereof toward the open position.

In order to close the doors 26 and 28, the piston rod 50 is contracted or withdrawn into the cylinder 52, and the action of the linkage assembly 40 is reversed. Of course, the extended position of the rod 50 is held securely during the entire time that it is desired to have the doors 26 and 28 in the open position, thus providing a positive locking thereof for precluding accidental closing of the doors during an unloading operation. Conversely, the cylinder 50 is held securely in the contracted position during the entire time that it is desired to keep the doors 26 and 28 in the closed position thereof, thus providing a positive lock therefor in order to preclude accidental discharging of the contents of the dump body 14. It will be apparent that the linkage assembly 40 is a double-acting type with a scissor-like operation during the opening and closing of the doors, resulting in a minimum distance through which the overall movement of the linkage assembly passes during its operation.

From the foregoing, it will be apparent that the present invention provides a novel partition for a dump body of an off-highway vehicle wherein the materials being loaded into the dump body are automatically substantially equally distributed therein for equalizing the load on the vehicle. In addition, a novel linkage assembly is provided for opening and closing the doors of the bottom dump type dump body of an off-highway vehicle wherein the contents of the dump body may be quickly discharged therefrom even when the dump body is of an extremely great size. The partition and linkage assembly are simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. In combination with an off-highway vehicle having a dump body provided with a bottom opening for discharge of materials therethrough, a pair of substantially identical longitudinally extending doors mounted in said opening and adapted for alternate opening and closing of the bottom opening, single linkage assembly means operably connected with said doors for opening and closing said doors, said linkage assembly being of a double-acting scissor-type operation maintaining the overall movement of the linkage assembly through a minimum distance during the opening and closing of the doors and single actuator means operably connected at substantially the mid-point of said linkage assembly for actuation thereof during said opening and closing of the doors, said linkage assembly comprising first bell crank means pivotally secured between the actuator means and a fixed pivot point, second bell crank means pivotally secured between said first bell crank means and a first lever means, said first lever means pivotally secured between a fixed pivot point and one of said doors for movement of said door between said open and closed positions therefor, link means pivotally secured to said first fixed pivot point and movable simultaneously with said first bell crank means, third bell crank means pivotally secured between said link means and a second lever means, said second lever means pivotally secured between a third fixed pivot point and the other of said doors for movement of said other door between said open and closed positions simultaneously with the opening and closing of said first-mentioned door.

2. The combination as set forth in claim 1 wherein the first lever means and associated elements are substantially parallel with said second lever means and associated elements but spaced slightly therefrom.

3. The combination as set forth in claim 1 and including pivotal support means secured between each of said doors and the vehicle for cooperation with said linkage assembly for support of said doors with respect to the vehicle.

4. The combination as set forth in claim 3 wherein said pivotal support means comprises a first pair of pivotal support members secured between each end of one door and the vehicle, and a second pair of pivotal support members secured between each end of the second door and the vehicle.

* * * * *